United States Patent
Rousseau et al.

(12) 
(10) Patent No.: US 6,889,042 B2
(45) Date of Patent: May 3, 2005

(54) CELLULAR MOBILE TELEPHONE SYSTEM USABLE ON BOARD A PASSENGER TRANSPORT VEHICLE

(75) Inventors: Jean-Rene Rousseau, Neuville S/Oise (FR); Jean-Francois Criqui, Asnieres (FR)

(73) Assignee: Alcatel, Paris (FR)

( * ) Notice: Subject to any disclaimer, the term of this patent is extended or adjusted under 35 U.S.C. 154(b) by 613 days.

(21) Appl. No.: 09/892,513

(22) Filed: Jun. 28, 2001

(65) Prior Publication Data

US 2002/0016168 A1 Feb. 7, 2002

Related U.S. Application Data

(63) Continuation-in-part of application No. 09/427,179, filed on Oct. 26, 1999, now abandoned.

(30) Foreign Application Priority Data

Oct. 28, 1998 (FR) .............................................. 98 13534

(51) Int. Cl.[7] .................................................. H04Q 7/20
(52) U.S. Cl. ................... 455/431; 455/13.4; 455/127.1; 455/522
(58) Field of Search ............................... 455/522, 13.4, 455/127.4, 575.9, 431, 430, 427, 11.1, 98, 12.1, 99, 562.1, 406, 407, 408

(56) References Cited

U.S. PATENT DOCUMENTS

| | | | | |
|---|---|---|---|---|
| 5,438,610 A | * | 8/1995 | Bhagat et al. | 455/431 |
| 5,519,761 A | * | 5/1996 | Gilhousen | 455/431 |
| 5,995,833 A | * | 11/1999 | Zicker | 455/430 |
| 6,002,929 A | * | 12/1999 | Bishop et al. | 455/431 |
| 6,052,604 A | | 4/2000 | Bishop, Jr. et al. | |
| 6,055,425 A | * | 4/2000 | Sinivaara | 455/431 |
| 6,345,186 B1 | * | 2/2002 | Schultz et al. | 455/441 |

FOREIGN PATENT DOCUMENTS

| | | |
|---|---|---|
| WO | WO 94/28684 | 12/1994 |
| WO | WO 98/21838 | 5/1998 |

\* cited by examiner

*Primary Examiner*—Jean Gelin
(74) *Attorney, Agent, or Firm*—Sughrue Mion, PLLC

(57) ABSTRACT

A cellular mobile telephone system usable on board a passenger transport vehicle includes a first transmitter-receiver station on board the vehicle and connected to an antenna external to the vehicle to establish an external radio link between the vehicle and a terrestrial mobile telephone network via a satellite. A base station system having at least one antenna inside the vehicle is connected to a base station controller. The base station system and the base station controller have functions analogous to those of a base station system in a standard mobile telephone network.

5 Claims, 1 Drawing Sheet

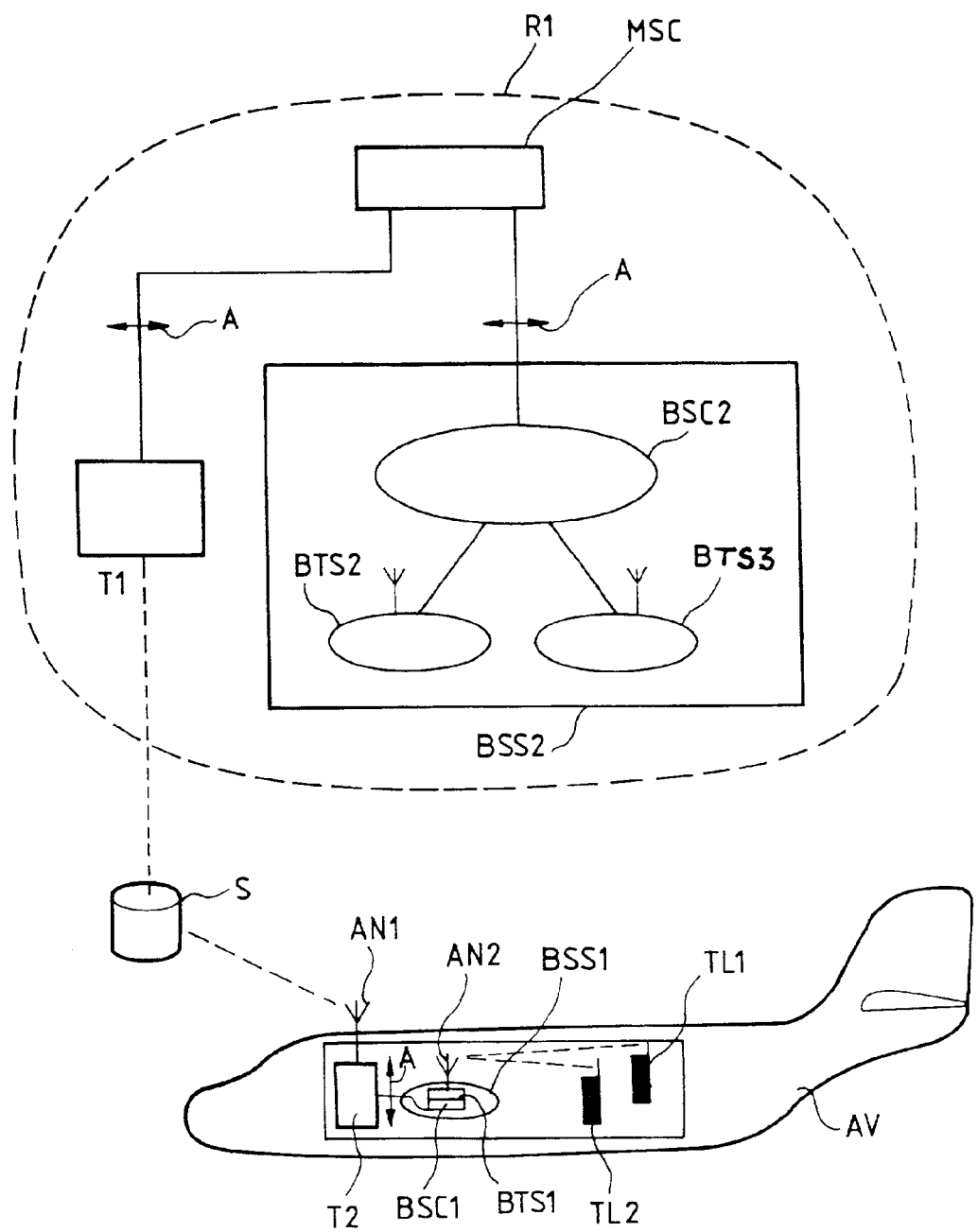

CELLULAR MOBILE TELEPHONE SYSTEM USABLE ON BOARD A PASSENGER TRANSPORT VEHICLE

This is a Continuation-in-Part of application Ser. No. 09/427,179 filed Oct. 26, 1999 now abandoned.

BACKGROUND OF THE INVENTION

1. Field of the Invention

The invention concerns a cellular mobile telephone system usable on board a passenger transport vehicle, for example an aircraft, a train, a ship, etc.

2. Description of the Prior Art

At present it is not possible to use a portable mobile telephone terminal on an aircraft, for example, as one might in any other public place, on the one hand because it is prohibited, the radiated signal having sufficient power to interfere with onboard electronic equipment, and on the other hand because it would be necessary to place the terminal near a window in order to be able to communicate with a base station system outside the cabin of the aircraft. A telephone service is currently available in aircraft via dedicated terminals each connected by a wire to fixed equipment including an antenna outside the aircraft. The equipment constitutes an interface with a telecommunication system, for example a satellite telecommunication system. The airline company offering the service must assume responsibility for the call billing aspects.

Document WO 98/21838 describes a cellular mobile telephone system usable on board an aircraft and enabling the use of standard GSM or DCS portable terminals. According to this prior art document, each GSM or DCS portable terminal is connected to a first electro-optical converter by a short shielded wire. The converter serves a small group of nearby passengers. The first converter converts a radio frequency signal from a portable terminal into an optical signal and vice-versa.

All the first converters are connected to a central unit by a network of optical fibers. The central unit includes second converters which convert an optical signal into a radio frequency signal and vice-versa. This prior art device avoids the radio frequency radiation that could leak from a network made up of long shielded cables. The central unit is connected to a transmitter-receiver station by short shielded cables. Each station has an antenna outside the aircraft and connects the aircraft to a GSM or DCS terrestrial mobile telephone network via a network of satellites.

The central unit has functions analogous to those of a base transceiver station in a standard mobile telephone network. A standard base transceiver station is connected to a base station controller. In the prior art device described in the above prior art document, the functions of a base station controller are not provided by the central unit on board the aircraft but instead by a controller on the ground. The disadvantage of the prior art device is that it necessitates a permanent link for transmitting signaling information between the aircraft and the mobile telephone network on the ground, exactly like the link which connects a standard base transceiver station to a standard base station controller. The permanent link consumes network resources.

An object of the invention is to propose a system which is free of the drawbacks of the above prior art device and which extends the cellular mobile telephone service provided by the standard operators to passenger transport vehicles, enabling passengers to use their standard portable terminal without having to connect them to a cable and without the transportation company offering the service having to assume responsibility for the call billing aspects.

SUMMARY OF THE INVENTION

The invention consists in a cellular mobile telephone system usable on board a passenger transport vehicle, the system including:

- a first transmitter-receiver station on board the vehicle and connected to an antenna external to the vehicle to establish an external radio link between the vehicle and a terrestrial mobile telephone network, and
- means in the vehicle for coupling portable mobile telephone terminals inside the vehicle to the transmitter-receiver station, the means including at least one second transmitter-receiver station having at least one antenna inside the vehicle and a base station controller connected to each second transmitter-receiver station and to the first station, the controller and the second transmitter-receiver station having functions analogous to those of a base station system in a standard mobile telephone network.

The above device does not require a permanent connection for transmitting signaling information between the aircraft and the mobile telephone network on the ground, because there is a base station controller on board. The connection can be broken if there is no call in progress with the ground and then reconnected when a passenger requests communication between the vehicle and the ground again.

The system enables a mobile telephone service to be offered to all passengers who are signed up with an operator who has entered into a roaming agreement with the operator of the network to which the vehicle is connected by the external radio link. The operator who has entered into the agreement with the transport company therefore considers the passengers as visitors.

The system of the invention enables transport companies to offer passengers in a vehicle a conventional cellular telephone service in a very simple manner and avoiding all billing problems, which are settled by the standard interworking rules and principles that apply when adjoining cellular networks are managed by different operators.

The advantages of the system of the invention are:

1) Rapid deployment of the service because the remote part of a cellular architecture conforming to an existing standard (for example the GSM standard) can be connected without technical problems to the terrestrial infrastructures of all existing cellular network operators conforming to the standard.

2) Easy implementation because it is possible to use the standard principles of interworking between networks of different operators.

3) The system can be adapted to any mobile telephone standard used on board the vehicle: for example, by using a GSM base station system for GSM terminals or a CDMA base station system for CDMA terminals, etc.

4) The system enables the use of standard portable terminals without risk of interfering with onboard electronic equipment. Cellular mobile telephone terminals always include means for regulating the transmitted power, which limit the transmitted power so that it is high enough for a good link and no higher. Because of the station on board the vehicle and having an antenna inside the vehicle, the regulator means of each portable terminal reduce the power transmitted by the terminal to a very low value, at which there is no risk of interfering with the electronic equipment of the vehicle.

The invention will be better understood and other features of the invention will become apparent from the following description and from the single FIGURE of the accompanying drawing.

BRIEF DESCRIPTION OF THE DRAWING

The single FIGURE of the accompanying drawing shows one embodiment of the system in accordance with the invention.

DETAILED DESCRIPTION OF THE PREFERRED EMBODIMENT

The single FIGURE shows one embodiment of a system in accordance with the invention used on board an aircraft AV for GSM terminals. In this embodiment, the system comprises:

- a base station system BSS1 (to use the GSM terminology) analogous to a GSM base station system routinely used in a terrestrial GSM network, the system BSS1 being on board the aircraft AV,
- an antenna AN2 inside the cabin of the aircraft and connected to the system BSS1 to enable it to communicate with GSM portable terminals TL1, TL2, etc used by passengers,
- a transmitter-receiver station T2 on board the aircraft, connected to an input-output of the system BSS1 and capable of communicating with a satellite,
- an antenna AN1 outside the aircraft AV and connected to the transmitter-receiver station T2.

The antenna AN1 provides a bidirectional radio link with a GSM terrestrial cellular mobile telephone network R1 via a satellite S and an earth station T1. The network R1 comprises a plurality of base station systems, in particular a system BSS2 shown in the FIGURE by way of example. The system BSS2 includes a base station controller BSC2, for example, which is connected:

- on the one hand, to a mobile service switching center (MSC) via an A interface (again using the GSM terminology), and
- on the other hand, to two base transceiver stations BTS1 and BTS2.

The onboard base station system BSS1 is analogous to a standard GSM base station system, such as the base station system BSS2, but is simplified because it requires less transmission power and a low capacity in terms of the number of mobile terminals. It therefore comprises a base station controller BSC1 and a base transceiver station BTS1 connected to the antenna AN2. The controller BSC1 is connected to the station T2 via an A interface.

The base station system BSS1 includes means enabling portable mobile telephone terminals TL1, TL2, etc inside the aircraft AV to send and receive data. It further includes means enabling the terminals TL1, TL2, etc to set up calls with each other.

As in a classical ground level GSM base station subsystem, the onboard base station subsystem BSS1 comprises means for transferring the charging data to the terrestrial mobile telephone network. In particular, it uses the standardized A interface. But the transfer is made via the bidirectional radio link comprising the transmitter-receiver station T2, the satellite S, and the transmitter-receiver station T1. The onboard base station subsystem BSS1 is thus built in conformance with the following IU-T standards;

GSM 08.01 (ETS 300 586-1): "Digital cellular telecommunication system (Phase 2); Base Station System-Mobile services Switching Centre (BSS-MSC) interface General aspects".

GSM 08.02 (ETS 300 586-2): "Digital cellular telecommunication system (Phase 2); Base Station System-Mobile-services Switching Centre (BSS-MSC) interface Interface principles".

GSM 08.04 (ETS 300 588): "Digital cellular telecommunication system (Phase 1); Base Station System-Mobile-services Switching Centre (BSS-MSC) interface Layer 1 specification".

GSM 08.06 (ETS 300 589): "Digital cellular telecommunication system (Phase 2); Signalling transport mechanism specification for the Base Station System-Mobile-services Switching Centre (BSS-MSC) interface".

GSM 08.08 (ETS 300 590): "Digital cellular telecommunication system (Phase 2); Mobile Switching Centre-Base Station System (MSC-BSS) interface Layer 3 specification".

GSM 08.20 (ETS 300 591): "Digital cellular telecommunication system (Phase 2); Rate adaption on the Base Station System-Mobile-services Switching Centre (BSS-MSC) interface".

GSM 08.51 (ETS 300 592): "Digital cellular telecommunication system (Phase 2); Base Station Controller-Base Transceiver Station (BSC-BTS) interface General aspects".

The station T2, the antenna AN2 and the ground station T1 can be analogous to those currently used for the telephone service on board aircraft. Depending on the likely traffic, the link between the aircraft AV and the network R1 can be a synchronous digital link (with a bit rate which is a multiple or sub-multiple of 2 Mbit/s) or a packet mode link. The ground station T1 is connected to the switching center MSC via an A interface. In one embodiment of the invention the A interface can be implemented on a link using the Internet protocol.

What is claimed is:

1. A cellular mobile telephone system usable on board a passenger transport vehicle, the system comprising:

a transmitter-receiver station on board said vehicle and connected to a first antenna external to said vehicle to establish an external radio link between said vehicle and a terrestrial mobile telephone network, and means in said vehicle for coupling portable mobile telephone terminals inside said vehicle to said transmitter-receiver station, said means including at least one base station system having at least a second antenna inside said vehicle and a base station controller connected to said base station system and to said transmitter-receiver station, said base station controller and said base station system having functions analogous to those of a base station system in a standard mobile telephone network, wherein said base station system utilizes said second antenna to communicate with said portable telephones via a wireless radio frequency communication link, and said base comprises means enabling the terminal to regulate its transmission power.

2. The system claimed in claim 1 wherein said external radio link is relayed by at least one satellite.

3. The system claimed in claim 1 wherein a base station system includes means enabling said portable mobile telephone terminals inside said vehicle to send and receive data.

4. The system claimed in claim 1 wherein a base station system includes means enabling portable mobile telephone terminals inside said vehicle to set up calls between them.

5. The system claimed in claim 1, wherein said base station controller comprises means for transferring charging data to the terrestrial mobile telephone network via the external radio link.

* * * * *